(12) United States Patent
Weisman, II et al.

(10) Patent No.: US 6,305,167 B1
(45) Date of Patent: Oct. 23, 2001

(54) METHOD OF CONTROLLING AN ENGINE WITH AN EGR SYSTEM

(75) Inventors: Steve Miller Weisman, II, Farmington Hills; Admir Kreso, Canton; Andrew May, Ann Arbor, all of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/540,017

(22) Filed: Mar. 31, 2000

Related U.S. Application Data
(60) Provisional application No. 60/193,837, filed on Mar. 31, 2000.

(51) Int. Cl.[7] .............................. F02B 37/24; F02M 25/07
(52) U.S. Cl. ..................... 60/602; 60/605.2; 123/568.12; 123/704
(58) Field of Search .......................... 123/568.11, 568.12, 123/568.21, 704; 60/600, 601, 602, 605.2

(56) References Cited

U.S. PATENT DOCUMENTS

| | | | |
|---|---|---|---|
| 4,168,683 | * 9/1979 | Hata et al. ............................ | 123/704 |
| 5,201,303 | * 4/1993 | Kojima ................................. | 123/704 |
| 6,003,316 | * 12/1999 | Baert et al. .......................... | 60/605.2 |
| 6,026,790 | 2/2000 | Itoyama . | |
| 6,029,451 | * 2/2000 | Gartner ................................ | 123/704 |
| 6,035,640 | * 3/2000 | Kolmanovsky et al. ........... | 60/605.2 |
| 6,055,810 | * 5/2000 | Borland et al. ..................... | 60/605.2 |
| 6,067,800 | * 5/2000 | Kolmanovsky et al. ............. | 60/602 |
| 6,076,353 | * 6/2000 | Freudenberg et al. ............. | 60/605.2 |
| 6,128,902 | * 10/2000 | Kolmanovsky et al. ........... | 60/605.2 |
| 6,148,616 | * 11/2000 | Yoshida et al. ..................... | 60/605.2 |
| 6,178,749 | * 1/2001 | Kolmanovsky et al. ........... | 60/605.2 |

FOREIGN PATENT DOCUMENTS

| | | | |
|---|---|---|---|
| 8-270454-A | * 10/1996 | (JP) ..................................... | 60/605.2 |
| 2000-170588-A | * 6/2000 | (JP) ..................................... | 60/605.2 |

* cited by examiner

*Primary Examiner*—Willis R. Wolfe
(74) *Attorney, Agent, or Firm*—Brooks & Kushman P.C.

(57) ABSTRACT

A method of controlling an internal combustion engine includes determining an exhaust gas recirculation (EGR) command signal based on at least one engine condition, and determining a variable geometry turbocharger (VGT) command signal based on at least one engine condition and at least partially based on the EGR command signal. Advantageously, the EGR system and VGT system may be continuously and simultaneously controlled, taking into account the effects of each system on the other, to provide improved and more precise control over engine air flow. In an alternative embodiment, an engine may be controlled with a feedback control system where engine intake chemical composition is the feedback variable.

24 Claims, 3 Drawing Sheets

METHOD OF CONTROLLING AN ENGINE WITH AN EGR SYSTEM

The present invention relates to a method of controlling an internal combustion engine including an exhaust gas recirculation system. Provisional patent application No. 60/193,837, naming Admir M. Kreso as inventor, and filed on Mar. 31, 2000, and titled "System and Method for Measuring Recirculated Exhaust Gas Flow in a Compression-Ignition Engine" is hereby incorporated by reference in its entirety.

TECHNICAL FIELD

1. Background Art

In the control of heavy duty internal combustion engines, the conventional practice utilizes electronic control units having volatile and non-volatile memory, input and output driver circuitry, and a processor that executes instructions to control the engine and its various systems and sub-systems. A particular electronic control unit communicates with numerous sensors, actuators, and other electronic control units to control various functions, which may include various aspects of field delivery, transmission control, and many others.

However, the heavy duty engine business is extremely competitive. Increased demands are being placed on engine manufacturers to design and build engines that provide better engine performance, improved reliability, and greater durability while meeting more stringent emission and noise requirements.

For the foregoing reasons, there is a need for an improved method of controlling an internal combustion engine including an exhaust gas recirculation (EGR) system with improved performance and more precise control than existing systems.

2. Disclosure of Invention

It is, therefore, an object of the present invention to provide a method of controlling an internal combustion engine with improved performance and more precise emission controls than existing systems, with some embodiments including an exhaust gas recirculation (EGR) system.

In carrying out the above object, a method of controlling an internal combustion engine is provided. The engine includes a variable geometry turbocharger (VGT) driven in response to a VGT command signal. The engine further includes a variable flow exhaust recirculation (EGR) system driven in response to an EGR command signal to recirculate exhaust to an engine intake mixture. The method comprises determining the EGR command signal based on at least one engine condition, and determining the VGT command signal based on at least one engine condition and at least partially based on the EGR command signal.

In a preferred embodiment, determining the VGT command signal further comprises determining a lead compensated signal based on the EGR command signal. The VGT command signal is determined at least partially based on the lead compensated signal. Further, preferably, determining the EGR command signal further comprises determining a desired carbon dioxide quantity of the intake mixture. The EGR command signal is then determined based on the desired carbon dioxide quantity. More preferably, determining the EGR command signal further comprises estimating an actual carbon dioxide quantity of the intake mixture. The desired carbon dioxide quantity is compared to the estimated actual carbon dioxide quantity to determine an error signal. The EGR command signal is based on the error signal. Further, in a preferred embodiment, determining the desired carbon dioxide quantity further comprises determining the desired carbon dioxide quantity based in part on an oxygen to fuel ratio of the intake mixture. Even further, in a preferred embodiment, determining the desired carbon dioxide quantity further comprises determining an engine torque demand and determining an engine speed. The desired carbon dioxide quantity is based on the oxygen to fuel ratio of the intake mixture, the torque demand, and the engine speed.

Even further, in a preferred embodiment, determining the EGR command signal further comprises determining the EGR command signal further based on at least one controller gain term. More preferably, the EGR command signal is further based on a gain normalization term.

Further, in carrying out the present invention, a method of controlling a compression-ignition internal combustion engine is provided. The engine includes a variable geometry turbocharger driven in response to a VGT command signal. The engine further includes a variable flow exhaust gas recirculation system driven in response to an EGR command signal to recirculate exhaust to an engine intake mixture. The method comprises determining an engine torque demand, determining an engine speed based at least partially on the driver accelerator demand and the engine speed. The method further comprises determining the EGR signal based at least partially on torque demand and engine speed. The method further comprises determining the VGT command signal based on at least one engine condition and at least partially based on the EGR command signal.

Still further, in carrying out the present invention, a method of controlling an internal combustion engine is provided. The engine includes a variable geometry turbocharger driven in response to a VGT command signal, and a variable flow exhaust gas recirculation system driven in response to an EGR command signal to recirculate exhaust to an engine intake mixture. The method comprises determining the EGR command signal based on at least one engine condition, determining a desired oxygen quantity of the intake mixture, and estimating an actual oxygen quantity of the intake mixture. The method further comprises determining the VGT command signal based on the desired oxygen quantity, the estimated actual oxygen quantity, and the EGR command signal.

In a preferred embodiment, determining the VGT command signal further comprises determining a feedforward term based on at least one engine condition, and determining the VGT command signal further based on the feedforward term. More preferably, the feedforward term is determined based on an engine torque demand and an engine speed.

In a preferred implementation, determining the VGT command signal further comprises determining a lead compensated signal based on the EGR command signal, and determining the VGT command signal based on the desired oxygen quantity, the estimated actual oxygen quantity, the lead compensated signal, and the feedforward term. A preferred method further comprises determining an adjusted oxygen quantity error signal based on the desired oxygen quantity, the estimated actual oxygen quantity, and lead compensated signal. The VGT command signal is determined based on the error signal and the feedforward term. In some implementations, the error signal is modified based on at least one controller gain term. In some embodiments, a gain normalization term is determined and the error signal is modified based on the gain normalization term. Preferably, the gain normalization term is based on a determined engine air intake flow. More preferably, determining the air intake flow further comprises determining an engine torque demand, determining an engine speed, and determining the engine air intake flow based on the torque demand and the engine speed. Most preferably, determining the gain normalization term further comprises determining the gain normalization term such that the term effectively eliminates the error signal for a significantly low air intake flow.

Yet further, in carrying out the present invention, a method of controlling an internal combustion engine is provided. The engine includes a variable flow exhaust gas recirculation system driven in response to an EGR command signal to recirculate exhaust to an engine intake mixture. The method comprises determining a desired engine intake mixture composed of a plurality of different components, estimating an actual engine intake mixture composition, and comparing the desired intake composition to the estimated actual intake composition.

The method further comprises controlling the engine based on the comparison.

In some embodiments, controlling the engine further comprises determining the EGR command signal. In some embodiments, the engine includes a variable geometry turbocharger driven in response to VGT command signal, and controlling the engine further comprises determining the VGT command signal. In a preferred embodiment, the engine includes a variable geometry turbocharger, and controlling the engine further comprises determining the EGR command signal based on the comparison, and determining the VGT command signal based at least partially on the EGR command signal.

Yet further, in carrying out the present invention, a computer readable storage medium has instructions stored thereon that are executable by a controller to perform methods of the present invention. The instructions direct the controller to control an internal combustion engine in accordance with one or more aspects of the various embodiments of the present invention.

The advantages associated with embodiments of the present invention are numerous. For example, methods of the present invention provide the integration of EGR and VGT controls to provide improved and more precise emission control. Further, embodiments of the present invention employ other novel features that may be used separately or together as in the preferred embodiment. Embodiments of the present invention are suitable for compression ignition engines, but some embodiments are suitable for spark ignition engines as well.

The above object and other objects, features, and advantages of the present invention are readily apparent from the following detailed description of the best mode for carrying out the invention when taken into connection with the accompanying drawings.

BEST MODE FOR CARRYING OUT THE INVENTION

Figure 1:
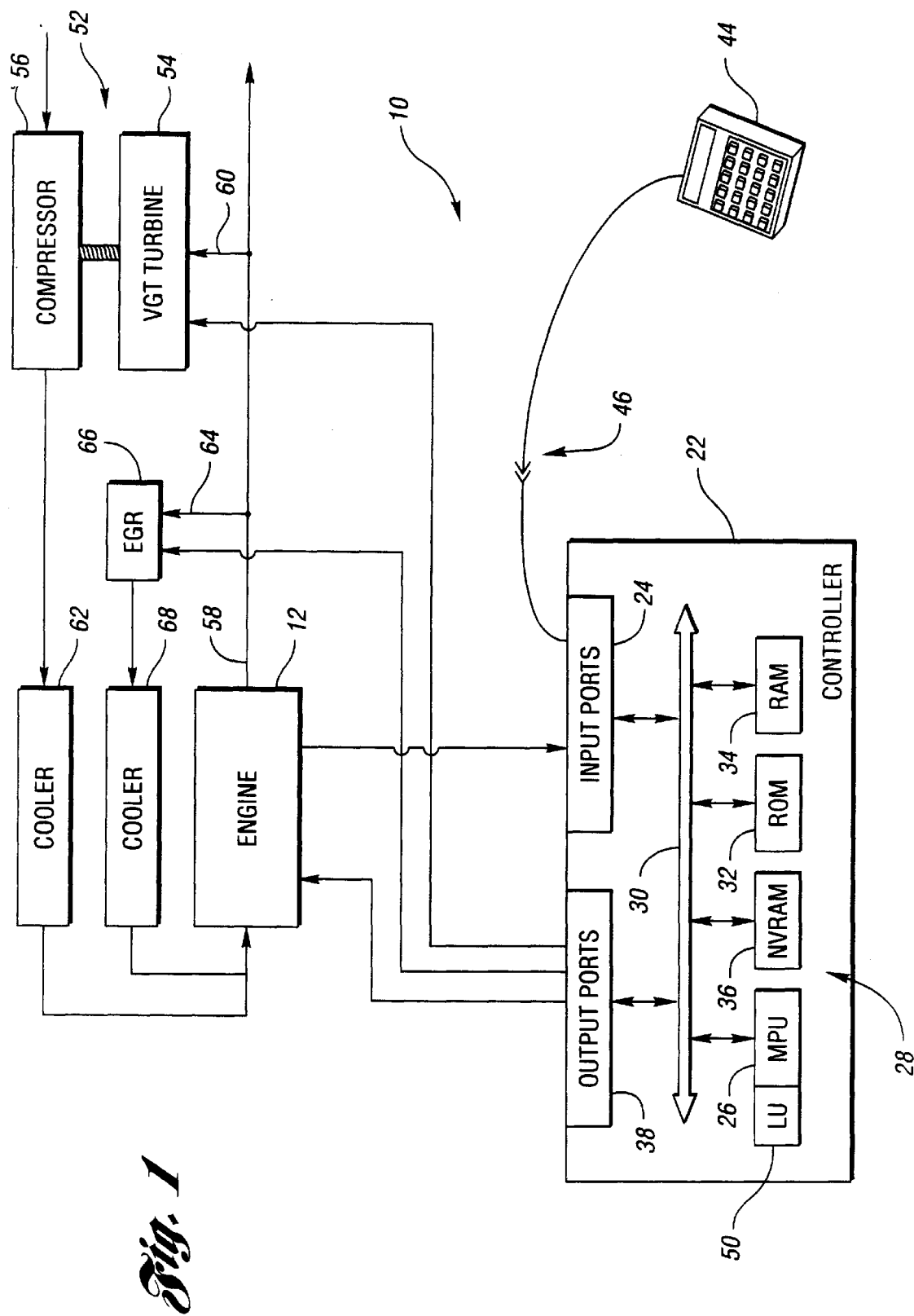
FIG. 1 is a schematic diagram of an internal combustion engine and engine control system made in accordance with an embodiment of the present invention.

With reference to FIG. 1, an internal combustion engine and associated control systems and subsystems are generally indicated at 10. System 10 includes an engine 12 having a plurality of cylinders, each fed by a fuel injector. In a preferred embodiment, engine 12 is a compression-ignition internal combustion engine, such as a heavy duty diesel fuel engine. The injectors receive pressurized fuel from a fuel supply in a known manner.

Various sensors are in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable flow exhaust gas recirculation (EGR) valve 66 and variable geometry turbocharger 52. The program instructions direct controller 22 to control the various systems and subsystems of the vehicle, with the instructions being executed by microprocessor 26, and optionally, instructions may also be executed by any number of logic units 50. Input ports 24 receive signals from various sensors, and controller 22 generates signals at output ports 38 that are directed to the various vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various vehicle sensors and executes control logic embedded in hardware and/or software to control the engine. In a preferred embodiment, controller 22 is the DDEC controller available from Detroit Diesel Corporation, Detroit, Mich. Various other features of this controller are described in detail in a number of different U.S. patents assigned to Detroit Diesel Corporation.

As is appreciated by one of ordinary skill in the art, control logic may be implemented in hardware, firmware, software, or combinations thereof. Further, control logic may be executed by controller 22, in addition to by any of the various systems and subsystems of the vehicle cooperating with controller 22. Further, although in a preferred embodiment, controller 22 includes microprocessor 26, any of a number of known programming and processing techniques or strategy may be used to control an engine in accordance with the present invention.

Further, it is to be appreciated that the engine controller may receive information in a variety of ways. For example, engine systems information could be received over a data link, at a digital input or at a sensor input of the engine controller.

With continuing reference to FIG. 1, controller 22 provides enhanced engine performance by controlling a variable flow exhaust gas recirculation valve 66 and by controlling a variable geometry turbocharger 52. Variable geometry turbocharger 52 includes a turbine 54 and a compressor 56. The pressure of the engine exhaust gasses causes the turbine to spin. The turbine drives the compressor, which is typically mounted on the same shaft. The spinning compressor creates turbo boost pressure which develops increased power during combustion.

A variable geometry turbocharger has moveable components in addition to the rotor group. These moveable components can change the turbocharger geometry by changing the area or areas in the turbine stage through which exhaust gasses from the engine flow, and/or changing the angle at which the exhaust gasses enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a variable geometry turbocharger, the turbine housing is oversized for an engine, and the air flow is choked down to the desired level. There are several designs for the variable geometry turbocharger. In one design, a variable inlet nozzle has a cascade of moveable vanes which are pivotable to change the area and angle at which the air flow enters the turbine wheel. In another design, the turbocharger has a moveable side wall which varies the effective cross-sectional area of the turbine housing. It is appreciated that embodiments of the present invention are not limited to any particular structure for the variable geometry turbocharger. That is, the term VGT as used herein means any controllable air pressurizing device including the above examples, and including a modulated waste gate valve.

An exhaust gas recirculation system introduces a metered portion of the exhaust gasses into the intake manifold. The EGR system dilutes the incoming fuel charge and lowers combustion temperatures to reduce the level of oxides of nitrogen. The amount of exhaust gas to be recirculated is controlled by EGR valve 66 and VGT. In accordance with the present invention, the EGR valve is a variable flow valve that is electronically controlled by controller 22. The geometry of the variable geometry turbocharger is also electronically controlled by controller 22. It is appreciated that there are many possible configurations for a controllable EGR valve, and embodiments of the present invention are not limited to any particular structure for the EGR valve. Further, it is appreciated that various sensors at the EGR valve may detect temperature and differential pressure to allow the engine control to determine the mass flow rate through the valve. In addition, it is appreciated that various different sensor configurations may be utilized in various parts of the exhaust flow paths to allow controller 22 to determine the various mass flow rates throughout the exhaust system, including flow through the EGR system and flow through the compressor, and any other flows.

In some embodiments, it may be desirable to provide a cooler 62 to cool the charge air coming from compressor 56. Similarly, in some embodiments, it may be desirable to provide a cooler 68 to cool the flow through the EGR system prior to reintroduction to engine 12 of the gasses.

Embodiments of the present invention include control logic that processes various inputs representing various engine conditions, and in turn, provides an EGR command signal and a VGT command signal. The EGR command signal commands a position for the variable flow EGR valve 66 to control gas flow through path 64, while the VGT command signal commands a geometry for VGT 52 to control gas flow through path 60. In a preferred embodiment of the present invention, the various techniques utilized to determine the EGR and VGT command signals are best shown in FIG. 2.

Figure 2:
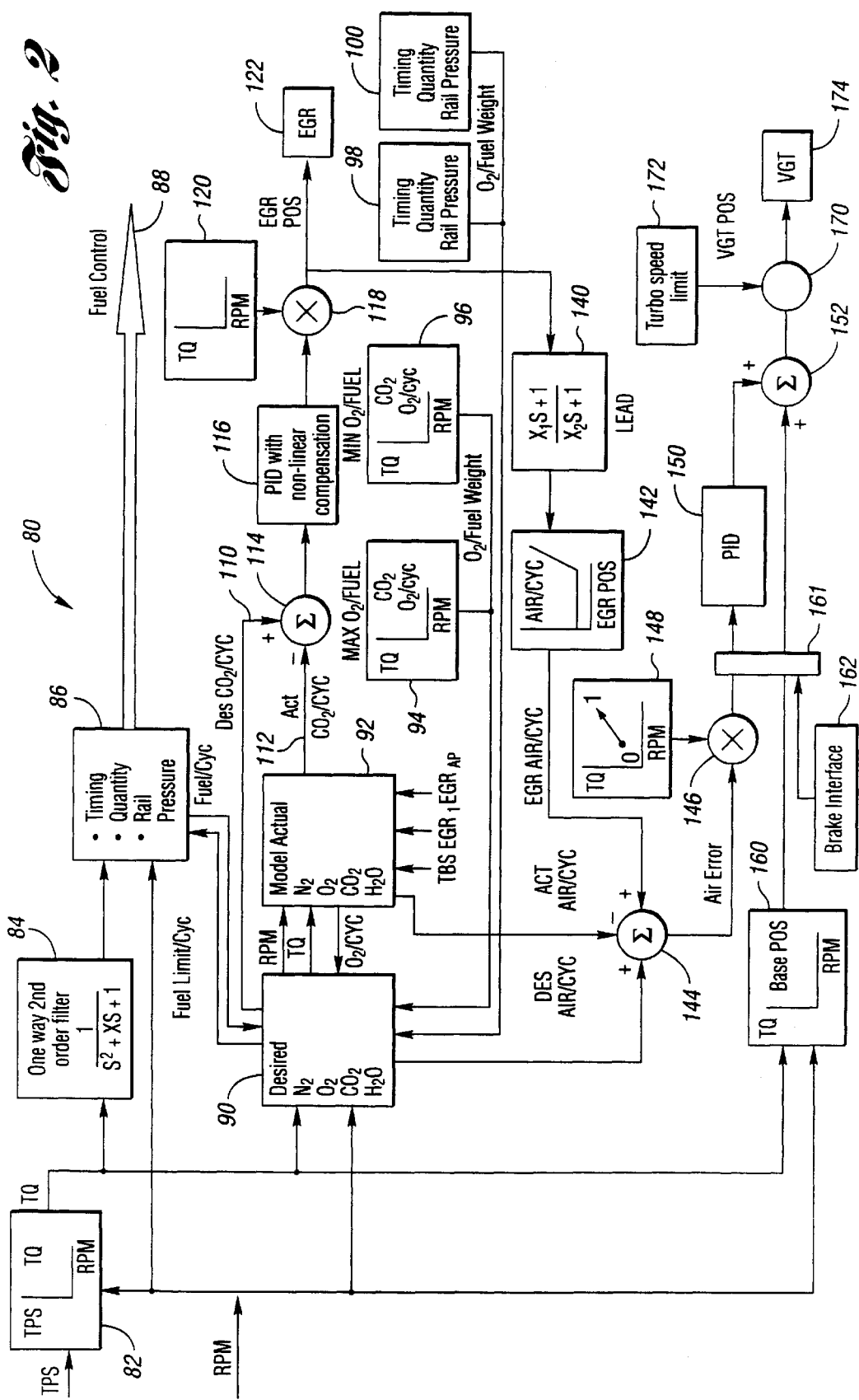
FIG. 2 is a block diagram illustrating an EGR and VGT control system of the present invention.

In FIG. 2, a block diagram 80 illustrates the functions of the control logic, including instructions, executed by controller 22 to provide enhanced engine performance and improved emission control. Embodiments of the present invention are particularly useful to improve emissions on heavy-duty diesel engines. Using EGR technology to mix a portion of exhaust gas with the intake charge reduces emissions of oxides of nitrogen ($NO_x$), while minimizing fuel economy impact and improving durability, in accordance with the present invention. In a turbo charged diesel engine, the back pressure necessary to drive the EGR flow from exhaust to intake manifolds is accomplished with the variable geometry turbocharger. The control of the EGR flow rate may be achieved via VGT geometry change (for example, vane position change), via EGR valve position change, and preferably via both. In preferred embodiments, the method of control employed results in interactions between EGR and VGT systems that are above the capabilities of existing systems.

There are many aspects of the present invention that may be used separately or together. In the preferred embodiment, the EGR valve and the VGT are controlled simultaneously and continuously. That is, preferred embodiments provide a continuously adjusting EGR/VGT controller. Preferred implementations of the present invention utilize desired intake manifold composition in terms of chemical species ($O_2$, $N_2$, $CO_2$ and $H_2O$) as a set point for the controller. The actual quantity of these chemical species is preferably calculated from a simplified combustion model.

With continuing reference to FIG. 2, in the embodiment illustrated, a driver accelerator position sensor input and an engine speed (rpm) input are received at block 82. Block 82 utilizes a look up table to determine an engine torque demand. The engine torque demand represents a fuel quantity that may be adjusted for other aspects of engine control that are not specifically described herein such as, for example, cylinder balancing. Further, it is appreciated that FIG. 2 illustrates a preferred implementation and that various aspects of the control strategy shown are preferred, but not specifically required. At block 84, a one way, second order filter adds some delay to the torque demand. Delay is added to allow the slower, air flow aspects of engine control to catch up to the faster responding torque demand aspects of engine control. At block 86, engine speed and filtered torque demand are received, and processed along with other engine conditions, resulting in desired fuel injection timing, quantity, and rail pressure. These factors control fuel delivery, indicated at 88.

At block 90, a desired chemical composition for the engine air intake is determined. The desired composition is in terms of chemical species ($N_2$, $O_2$, $CO_2$, and $H_2O$). The fuel per cycle is provided to block 90 from injection control block 86, and block 90 provides a fuel limit per cycle to block 86 (for example, fuel may be limited in low air flow conditions). At block 92, actual flow values for the EGR system and turbo charging system, the oxygen to fuel ratio, and chemical composition of the intake gasses are calculated. The calculations are based on a simplified combustion model and engine sensor inputs. The desired or set point values in block 90 are based on interpolation of values contained within five pairs of look up tables. For each pair of look up tables, the first table (94,98) corresponds to stabilized turbocharger boost pressure and the second table (96,100) corresponds to zero turbocharger boost pressure. That is, the first table corresponds to maximum oxygen per fuel (per cycle) while the second table corresponds to minimum oxygen per fuel. Depending on the current oxygen per fuel as determined from various measurements, desired values are interpolated between the two tables for the particular value.

For example, desired carbon dioxide and air values are determined with an interpolation between tables 94,96 (block 94 and block 96 each represent two look up tables, one table for $CO_2$ and one table for oxygen quantity/cycle, for a total of four tables). Similarly, desired values for timing parameters, quantity, and rail pressure are determined by interpolation (based on oxygen per fuel) between tables 98 and 100 (block 98 and block 100 each represent three tables). In accordance with preferred embodiments of the present invention, controller 22 adjusts VGT and EGR operation to achieve the desired values at block 90 (that are calculated with interpolation) within the respective minimum/maximum tables (96,100 and 94,98, respectively).

From block 90, a desired carbon dioxide quantity 110 is determined. From block 92, an actual carbon dioxide quantity is estimated. It is appreciated that the quantities are preferably represented as mass per cycle. Summer 114 compares the desired carbon dioxide quantity 110 to the actual carbon dioxide quantity 112 to determine the carbon dioxide error signal. EGR valve 122 is controlled by an EGR command signal based on the error signal. Preferably, a controller, such as a proportional/integral/derivative controller 116 (or preferably with a non linear compensation term, for example, a Smith predictor) adjusts the EGR valve position to achieve a desired EGR rate and desired carbon dioxide quantity. Further, in preferred embodiments, EGR loop gain normalization is contained within block 120 to improve transient response by reducing the effects of rapid changes in torque demand.

After loop gain normalization, the resultant EGR command signal is supplied by controller 22 (FIG. 1) to EGR valve 122. Preferably, the EGR command signal is also passed to the VGT control, as described below.

In controlling VGT 174, a base geometry (vane position in the preferred implementation), is determined at block 160 based on torque demand and engine speed. The commanded base position is passed from block 160 to block 161. At block 162, a brake interface allows engine braking control logic to override a commanded base position by the normal VGT logic in the event that the engine is being operated as an engine brake. Engine braking uses the engine as a compressor to dissipate lower amounts of energy over a longer amount of time, as opposed to normal vehicle brakes that dissipate a large amount of energy for a shorter amount of time.

The base geometry block 160 serves as a feedforward feature for VGT control to improve transient response and also enable open loop control when desired as described further below.

The EGR command signal is received by lead compensation logic 140 to determine a lead compensated signal based on the EGR command signal. In embodiments of the present invention, this portion of the control loop synchronizes simultaneous EGR valve and VGT geometry control. Particularly, when EGR valve control alone is not sufficient to achieve desired EGR rate, the VGT geometry is modified to increase air flow through the turbine until the desired EGR flow is achieved. The lead term 140 improves transient response to compensate for the turbo boost lag. That is, when EGR valve control is not sufficient to achieve desired carbon dioxide content in the engine intake, increased flow through the turbine increases the overall air flow, but the turbine becomes less efficient, increasing the back pressure that drives carbon dioxide containing exhaust gasses through the recirculation path, resultingly increasing the carbon dioxide mass per cycle at the intake.

At block 142, an additional compensation term based on EGR valve position modifies the lead compensator output. As shown, summer 144 receives a desired air per cycle signal and a actual air per cycle signal to determine an air error. Lead compensator 140 and additional compensator 142 anticipate and exaggerate the air error when it is expected that the EGR valve is opening. The air error determined at block 144 and/or the base geometry (for example vane position) as determined at block 160 are used to determine the VGT command signal.

Figure 5:
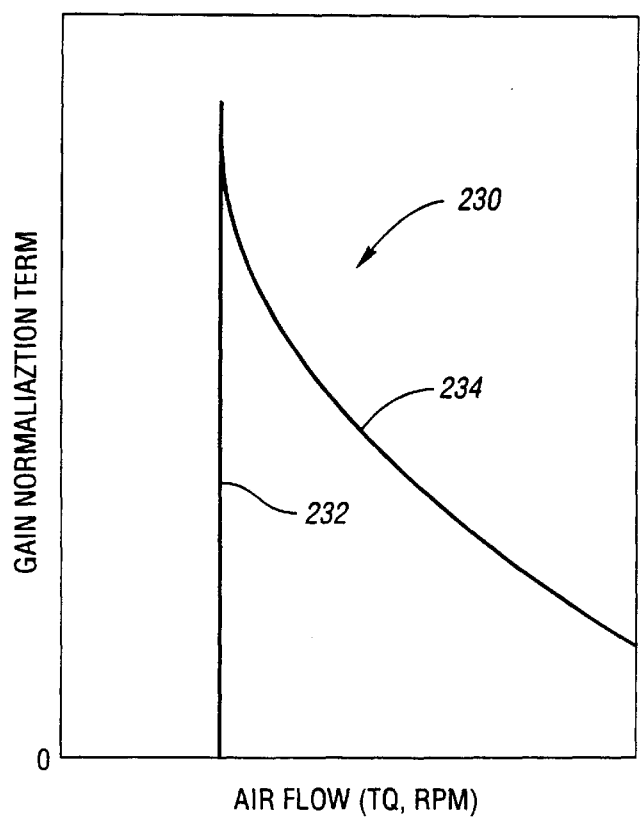
FIG. 5 is a graph depicting a gain normalization term versus air flow in an embodiment of the present invention.

Preferably, at block 148, normalization values contained within block 148 linearize the loop gain of PID controller 150, and serve as a variable switch between open and closed loop control approaches. That is, at low air flow conditions (low engine speed and low torque demand), the normalization factor reduces the air error to zero or to a sufficiently low value so as to be effectively insignificant in controlling VGT 174. That is, at low air flow conditions, normalization effectively eliminates the air error signal leaving the base geometry (the feedforward term) to control the VGT in an open loop fashion. On the other hand, once air flow reaches a sufficient level, the gain normalization factor jumps from zero to a sufficiently great value to control VGT 174 and linearize PID controller 150. As air flow continues to increase, the normalization factor decreases because at higher air flows, PID controller 150 is more effective. An exemplary implementation for normalization block 148 is shown in FIG. 5 at 230. As shown, the gain normalization term is zero at low air flows. Air flow is preferably determined as a function of torque demand and engine speed. Once significant air flow exists (reference number 232), the gain normalization term is significantly increased to change from effectively pure open loop control of the VGT with the feedforward term to closed loop control of the VGT (with the feedforward term). As air flow continues to increase, the gain normalization term is reduced as indicated at 234.

As shown by summer 152, the base vane position (or other suitable geometry indicator depending on the implementation) from block 160 provides the general control of the VGT command signal, while the signal derived from the air error provides fine tuning (except at low air flow conditions where the air error portion is effectively ignored and open loop control used). Coming out of the summer 152, limiter 170 limits the VGT command signal as needed to prevent turbo overspeeding. For example, at higher altitudes, continued demands for more oxygen may result in a turbo overspeed. This situation is prevented by turbo speed limit at block 172. After limiting, if necessary, the VGT command signal is applied to VGT 174. As explained above, the EGR command signal is utilized (with lead compensation) to adjust an air error signal to provide fine tuning of the VGT command signal. As such, continuous, simultaneous control of both the EGR and VGT systems allow the effects of these systems on each other to be taken into account during the control strategy. Lead term 140 improves transient response. Accordingly, the control loop also works in the opposite direction, adjusting the EGR valve position if a desired boost (or air/fuel ratio) is not achieved. That means, at tables 94,96, at lower oxygen per fuel, the value in the minimum $CO_2$ table commands a desired carbon dioxide quantity of zero. The upper $Co_2$ table is desired $CO_2$ quantity at an upper oxygen per fuel ratio. The lower $CO_2$ defines a lower oxygen per fuel ratio at which desired $CO_2$ is zero. That is, when the engine is already running fuel rich, tables 94 and 96 are interpolated such that desired carbon dioxide quantity is zero. As such, the function used to interpolate between the two carbon dioxide tables may be significantly different than the function used to interpolate between the two air quantity tables. Further, it is appreciated that the interpolation between any two tables is not limited to linear interpolation, but may take other forms.

Advantageously, and as mentioned previously at blocks 86 and 90, the overall air system VGT/EGR controller is directly linked to fuel delivery controller 86. During the normal engine operating conditions, the air system acts to track fuel system requirements to achieve desired engine power. However, during the marginal air/fuel ratio operation, the air system adapts to become the master controller governing maximum fuel delivery to limit excessive smoke and particulate emissions, as indicated by the fuel limit per cycle.

In another aspect of the present invention that is not necessarily limited to the control techniques shown in FIG.

Figure 3:
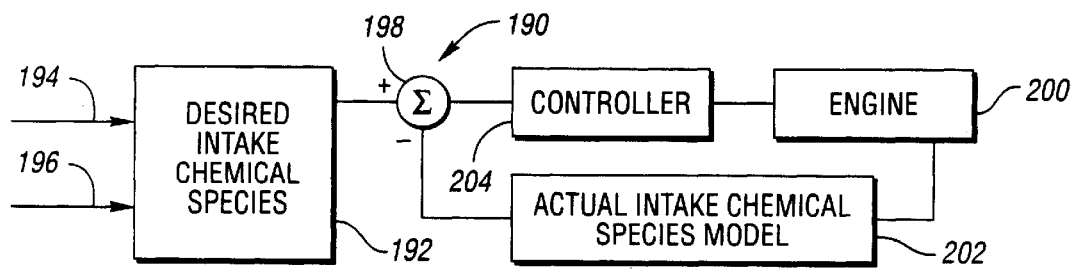
FIG. 3 is a block diagram illustrating an engine control system of invention.

2, FIG. 3 illustrates a feedback control system for an engine based on desired intake chemical species at 190. At block 192, desired intake chemical species is determined based on engine condition inputs 194 and 196 (for example, torque demand and engine speed). Summer 198 compares the desired intake chemical species 192 to the actual intake chemical species as estimated from a model 202. The model includes various engine conditions measured from engine 200. An error between the desired intake chemical species and the actual intake chemical species is passed to controller 204 which controls engine 200 to track the actual intake chemical species according to the species model to the desired intake chemical species which are based on engine conditions. For example, desired relative mass quantity per cycle (and/or actual mass per cycle) may be determined for various chemical species at the engine intake such as $N_2$, $O_2$, $CO_2$, and $H_2O$. Actual engine intake chemical species composition may be modeled empirically, and errors in composition are determined by summing logic 198. Controller 204 controls the engine to track the actual species composition to the desired. Chemical species feedback techniques may be utilized generally to control the engine in accordance with the present invention, or in the preferred embodiment illustrated in FIG. 2.

Figure 4:
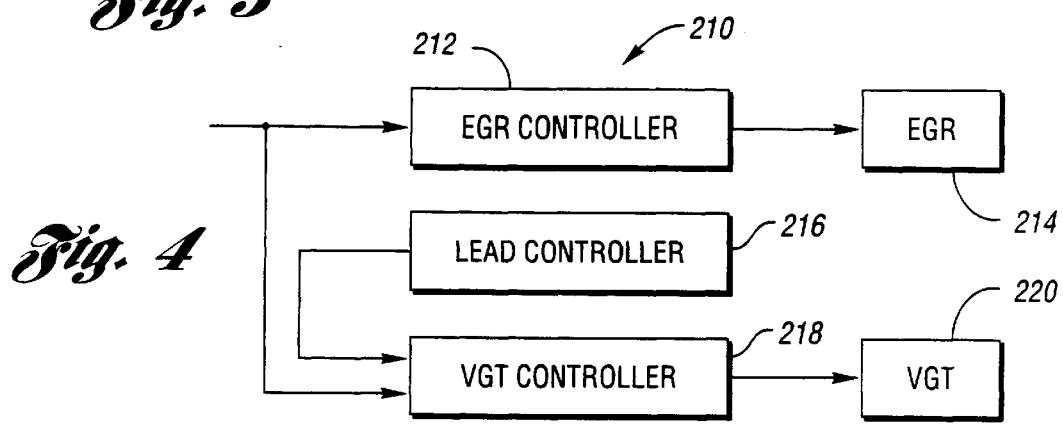
FIG. 4 is a block diagram illustrating an engine control system of the present invention.

In FIG. 4, another system of the present invention is generally indicated at 210. In system 210, an EGR controller 212 determines an EGR command signal that is passed to a variable flow EGR valve 214. The EGR command signal is also passed to the lead compensation block 216. VGT controller 218 receives various engine inputs in addition to an input from compensation block 216. VGT controller 218 determines the VGT command signal based at least in part on the EGR command signal (preferably with lead compensation at block 216) to control VGT 220.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling an internal combustion engine, the engine including a variable geometry turbocharger (VGT) driven in response to a VGT command signal, the engine further including a variable flow exhaust gas recirculation (EGR) system driven in response to an EGR command signal to recirculate exhaust to an engine intake mixture, the method comprising:

determining the EGR command signal based on at least one engine condition;

determining a desired oxygen quantity of the intake mixture;

estimating an actual oxygen quantity of the intake mixture;

determining an engine torque demand;

determining an engine speed;

determining a feedforward term based on the torque demand and the engine speed; and determining the VGT command signal based on the desired oxygen quantity, the estimated actual oxygen quantity, the EGR command signal, and the feedforward term.

2. A method of controlling an internal combustion engine, the engine including a variable geometry turbocharger (VGT) driven in response to a VGT command signal, the engine further including a variable flow exhaust gas recirculation (EGR) system driven in response to an EGR command signal to recirculate exhaust to an engine intake mixture, the method comprising:

determining a desired carbon dioxide quantity of the intake mixture;

estimating an actual carbon dioxide quantity of the intake mixture;

comparing the desired carbon dioxide quantity to the estimated actual carbon dioxide quantity to determine an error signal;

determining the EGR command signal based on the error signal; and determining the VGT command signal based on at least one engine condition and at least partially based on the EGR command signal.

3. The method of claim 2 wherein determining the desired carbon dioxide quantity further comprises:

determining the desired carbon dioxide quantity based in part on an oxygen to fuel ratio of the intake mixture.

4. The method of claim 3 wherein determining the desired carbon dioxide quantity further comprises:

determining an engine torque demand;

determining an engine speed; and determining the desired carbon dioxide quantity based on the oxygen to fuel ratio of the intake mixture, the torque demand, and the engine speed.

5. The method of claim 4 wherein determining the EGR command signal further comprises:

determining the EGR command signal further based on at least one controller gain term.

6. The method of claim 5 wherein determining the EGR command signal further comprises:

determining the EGR command signal further based on a gain normalization term.

7. The method of claim 6 wherein determining the VGT command signal further comprises:

determining a lead compensated signal based on the EGR command signal; and determining the VGT command signal at least partially based on the lead compensated signal.

8. A method of controlling an internal combustion engine, the engine including a variable geometry turbocharger (VGT) driven in response to a VGT command signal, the engine further including a variable flow exhaust gas recirculation (EGR) system driven in response to an EGR command signal to recirculate exhaust to an engine intake mixture, the method comprising:

determining the EGR command signal based on at least one engine condition;

determining a lead compensated signal based on the EGR command signal;

determining a desired oxygen quantity of the intake mixture;

estimating an actual oxygen quantity of the intake mixture;

determining a feedforward term based on at least one engine condition; and determining the VGT command signal based on the desired oxygen quantity, the estimated actual oxygen quantity, the EGR command signal, the lead compensated signal, and the feedforward term.

9. The method of claim 8 further comprising:

determining an adjusted oxygen quantity error signal based on the desired oxygen quantity, the estimated actual oxygen quantity, and the lead compensated signal;

determining the VGT command signal based on the error signal and the feedforward term.

10. The method of claim 9 wherein determining the VGT command signal further comprises:
    modifying the error signal based on at least one controller gain term.

11. The method of claim 9 further comprising:
    determining a gain normalization term; and
    modifying the error signal based on the gain normalization term.

12. The method of claim 11 further comprising:
    determining an engine air intake flow; and
    determining the gain normalization term based on the air intake flow.

13. The method of claim 12 wherein determining the air intake flow further comprises:
    determining an engine torque demand;
    determining an engine speed; and
    determining the engine air intake flow based on the torque demand and the engine speed.

14. The method of claim 12 wherein determining the gain normalization term further comprises:
    determining the gain normalization term such that the term effectively eliminates the error signal for significantly low air intake flow.

15. A method of controlling an internal combustion engine, the engine including a variable flow exhaust gas recirculation (EGR) system driven in response to an EGR command signal to recirculate exhaust to an engine intake mixture, the method comprising:
    determining a desired engine intake mixture composition composed of a plurality of different components;
    estimating an actual engine intake mixture composition;
    comparing the desired engine intake mixture composition to the estimated actual engine intake mixture composition; and
    controlling the engine based on the comparison such that the actual engine intake mixture composition tracks the desired engine intake mixture composition.

16. The method of claim 15 wherein controlling the engine further comprises:
    determining the EGR command signal.

17. The method of claim 15 wherein the engine includes a variable geometry turbocharger (VGT) driven in response to a VGT command signal, and wherein controlling the engine further comprises:
    determining the VGT command signal.

18. The method of claim 15 further wherein the engine includes a variable geometry turbocharger (VGT) driven in response to a VGT command signal, and wherein controlling the engine further comprises:
    determining the EGR command signal based on the comparison; and
    determining the VGT command signal based at least partially on the EGR command signal.

19. A computer readable storage medium having instructions stored thereon that are executable by a controller to perform a method of controlling an internal combustion engine, the engine including a variable geometry turbocharger (VGT) driven in response to a VGT command signal, the engine further including a variable flow exhaust gas recirculation (EGR) system driven in response to an EGR command signal to recirculate exhaust to an engine intake mixture, the medium further comprising:
    instructions for determining a desired carbon dioxide quantity of the intake mixture;
    instructions for estimating an actual carbon dioxide quantity of the intake mixture;
    instructions for comparing the desired carbon dioxide quantity to the actual carbon dioxide quantity to determine an error signal;
    instructions for determining the EGR command signal based on the error signal; and
    instructions for determining the VGT command signal based on at least one engine condition and at least partially based on the EGR command signal.

20. The medium of claim 19 wherein the instructions for determining the desired carbon dioxide quantity further comprise:
    instructions for determining the desired carbon dioxide quantity based in part on an oxygen to fuel ratio of the intake mixture.

21. The medium of claim 20 wherein the instructions for determining the desired carbon dioxide quantity further comprise:
    instructions for determining an engine torque demand;
    instructions for determining an engine speed; and
    instructions for determining the desired carbon dioxide quantity based on the oxygen to fuel ratio of the intake mixture, the torque demand, and the engine speed.

22. The medium of claim 21 wherein the instructions for determining the EGR command signal further comprise:
    instructions for determining the EGR command signal further based on at least one controller gain term.

23. The medium of claim 22 wherein the instructions for determining the EGR command signal further comprise:
    instructions for determining the EGR command signal further based on a gain normalization term.

24. The medium of claim 23 wherein the instructions for determining the VGT command signal further comprise:
    instructions for determining a lead compensated signal based on the EGR command signal; and
    instructions for determining the VGT command signal at least partially based on the lead compensated signal.

* * * * *